No. 815,325. PATENTED MAR. 20, 1906.
J. W. ARTHUR.
BEET HARVESTER.
APPLICATION FILED FEB. 17, 1905.
5 SHEETS—SHEET 4.
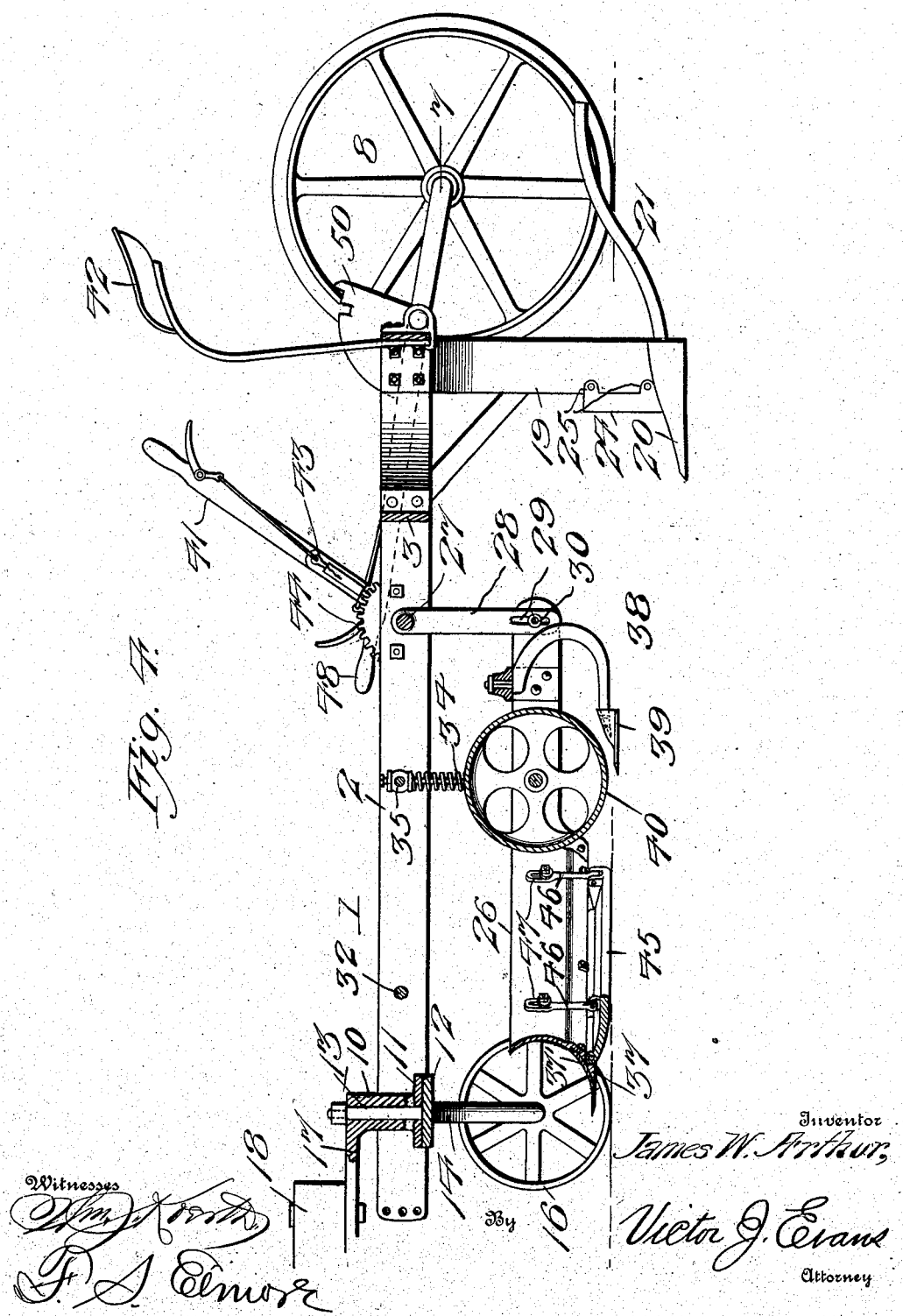
Witnesses
Inventor
James W. Arthur,
By
Victor J. Evans
Attorney No. 815,325. PATENTED MAR. 20, 1906.
J. W. ARTHUR.
BEET HARVESTER.
APPLICATION FILED FEB. 17, 1905.
5 SHEETS—SHEET 5.
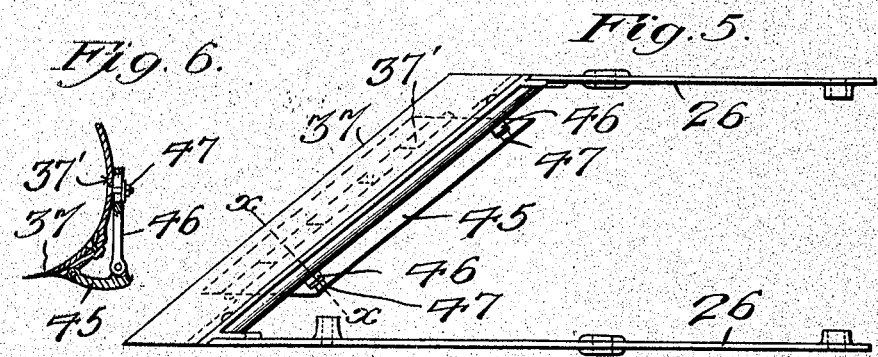
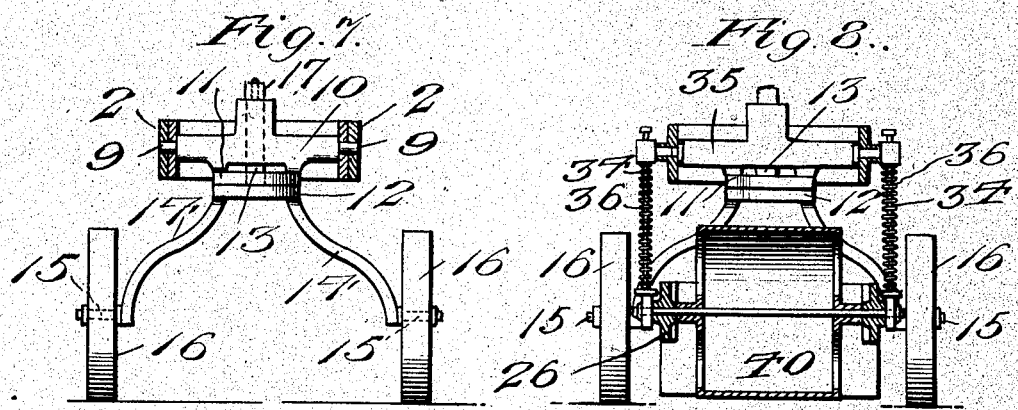
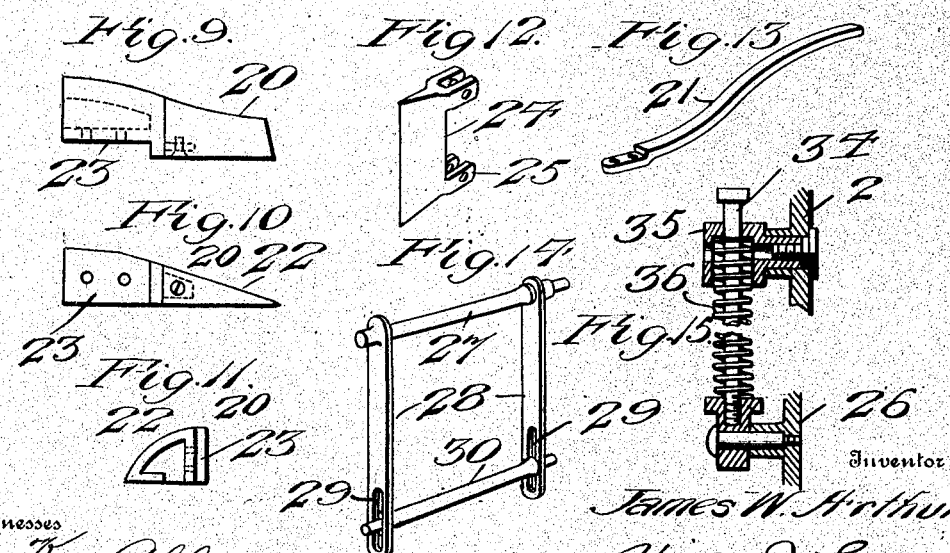
Witnesses
K. Allen
D. S. Elmore
Inventor
James W. Arthur
By Victor J. Evans
Attorney

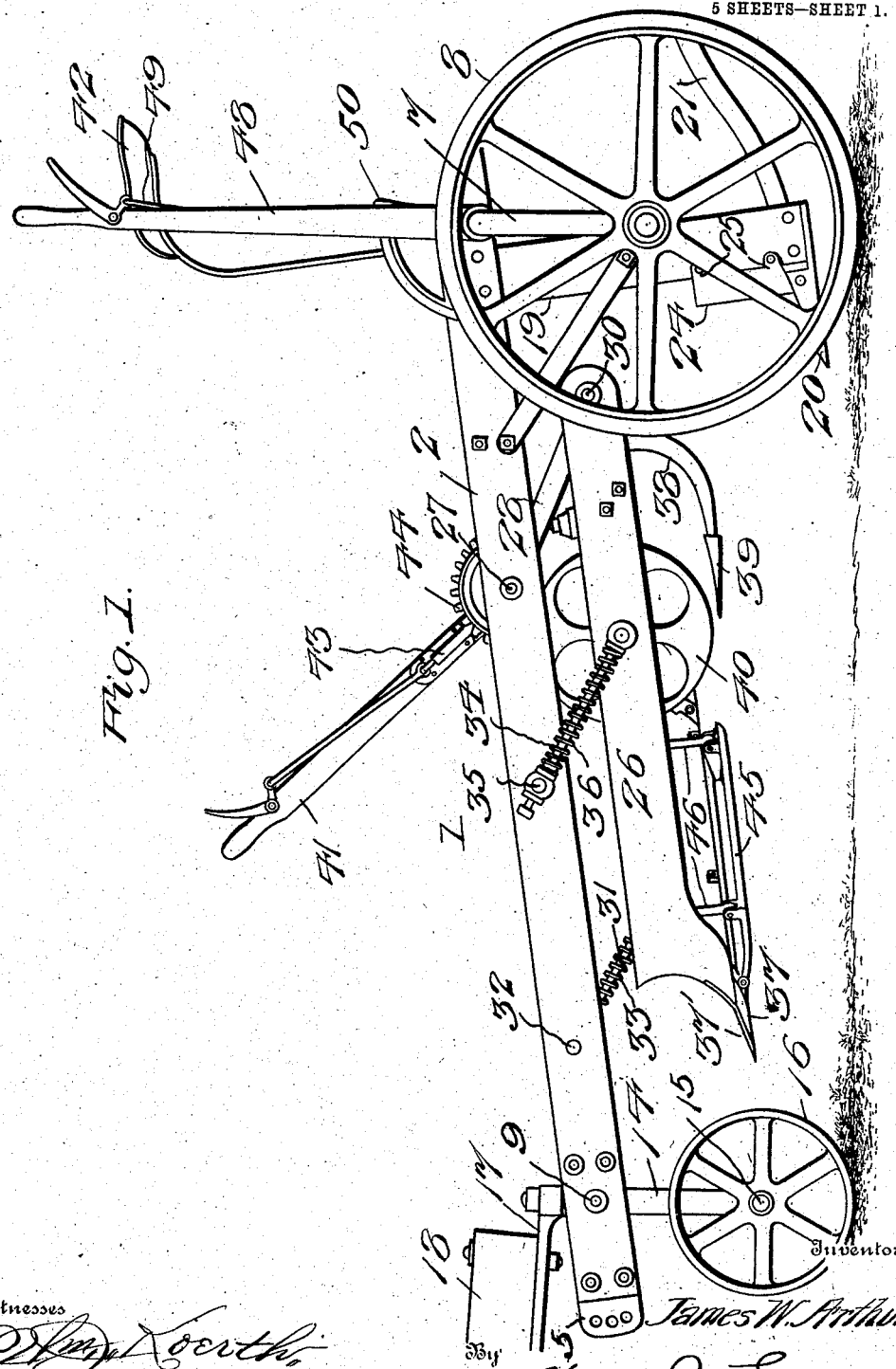

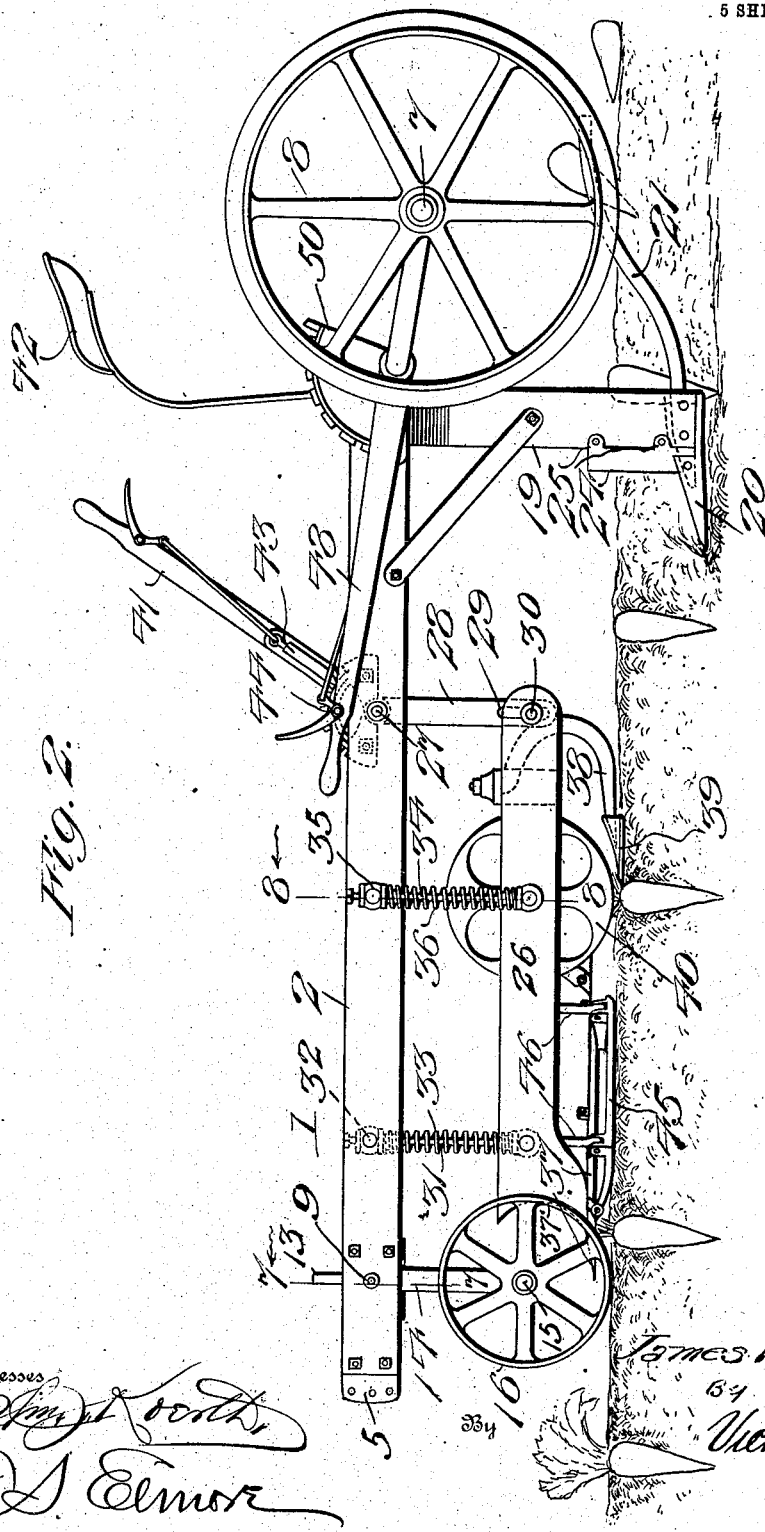

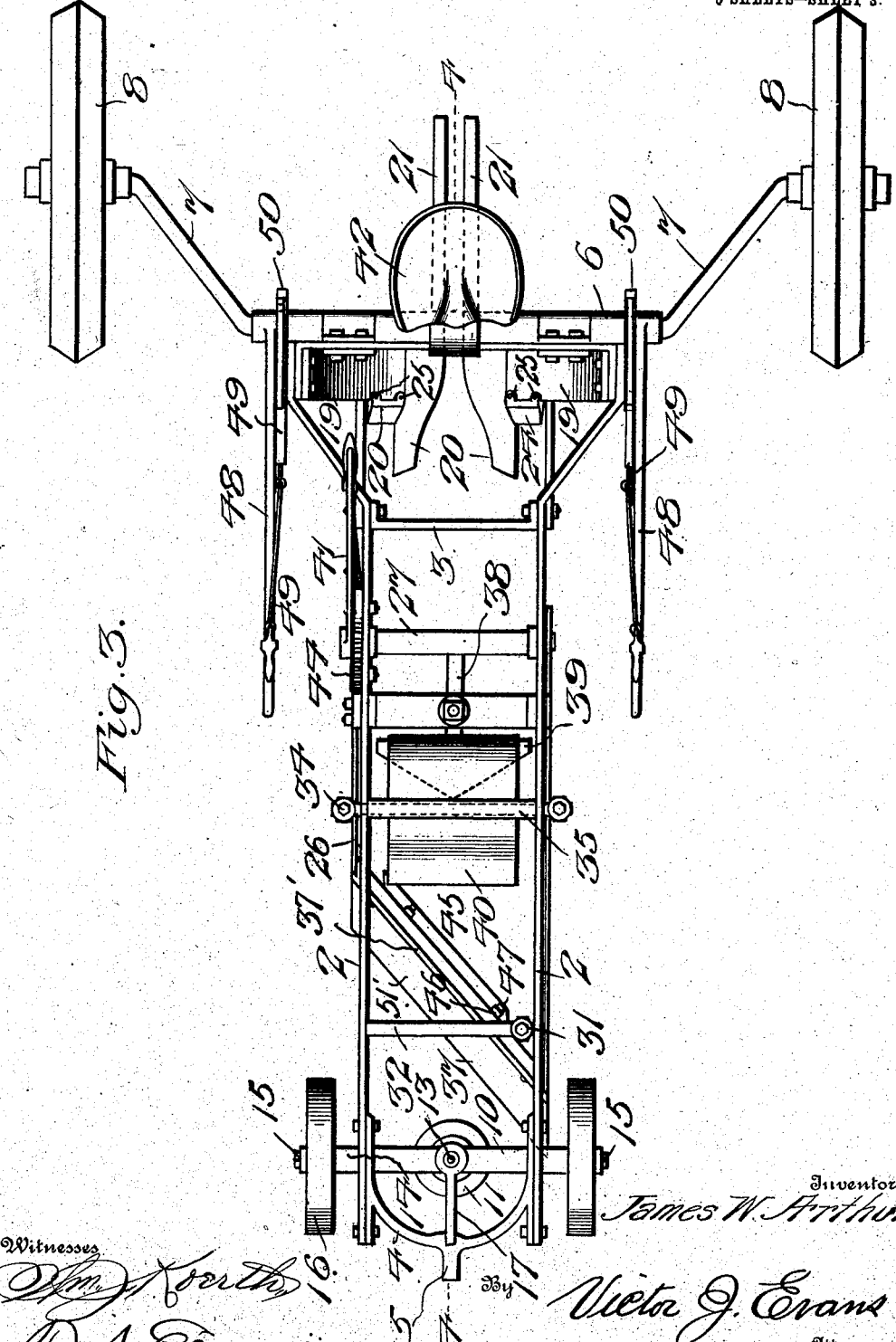

UNITED STATES PATENT OFFICE.

JAMES W. ARTHUR, OF DENVER, COLORADO, ASSIGNOR TO THE ARTHUR BEET HARVESTER AND IMPLEMENT CO., A CORPORATION OF COLORADO.

BEET-HARVESTER.

No. 815,325.     Specification of Letters Patent.     Patented March 20, 1906.

Application filed February 17, 1905. Serial No. 246,114.

*To all whom it may concern:*

Be it known that I, JAMES W. ARTHUR, a citizen of the United States of America, residing at Denver, in the county of Denver and State of Colorado, have invented new and useful Improvements in Beet-Harvesters, of which the following is a specification.

This invention relates to beet-harvesting machines of the type embodying a foliage-cutter, a topping device, and beet-pulling devices, and has for its objects to produce a comparatively simple inexpensive device of this character in which during the travel of the machine in operation the beets will be properly and uniformly topped and raised from and deposited upon the surface of the ground, one wherein injury to the beets during the topping and pulling operations will be obviated, and one in which the frame carrying the cutting and topping devices will be automatically regulated to accord with surface irregularities, thereby insuring the topping operation being properly performed.

Further objects of the invention are to provide a harvester in which the beet-lifting devices may be readily raised from or lowered into the ground and their depth of entrance into the latter properly regulated and one wherein the frame carrying the cutting and topping blades may be moved to and locked in inactive position, as circumstances require.

With these and other objects in view the invention comprises the novel features of construction and combination of parts more fully hereinafter described.

In the accompanying drawings, Figure 1 is a side elevation of a harvester embodying the invention and showing the parts in elevated or inactive position. Fig. 2 is a similar view showing the beet lifting and topping devices lowered to active position. Fig. 3 is a top plan view of the machine. Fig. 4 is a central longitudinal sectional elevation, the section being taken on the line 4 4 of Fig. 3 and showing the parts in the position illustrated in Fig. 2. Fig. 5 is a plan view, on an enlarged scale, of the foliage-cutter. Fig. 6 is a detail section taken on the line x x of Fig. 5. Fig. 7 is a detail view, partly in section, taken on the line 7 7 of Fig. 2 and viewed in the direction of the arrow. Fig. 8 is a view partly in section, the section being taken on the line 8 8 of Fig. 2 and viewed in the direction of the arrow. Fig. 9 is a plan view of one of the beet-lifting members or shoes. Fig. 10 is a side elevation of the same. Fig. 11 is a rear elevation of the same. Fig. 12 is a detail view of one of the cutting-blades which break the soil at the sides of the rows of beets. Fig. 13 is a detail perspective view of one of the lifting members or arms carried by the beet-lifting shoes. Fig. 14 is a perspective view of the rear hanger for the frame which carries the cutting and topping devices. Fig. 15 is a detail view, partly in section, on an enlarged scale, of one of the yieldable braces for the topping and cutting frame.

Referring to the drawings, 1 designates the main frame of the machine, comprising a pair of side bars 2, connected adjacent their rear ends by a transverse bar 3 and at their forward ends by a brace-frame 4, provided with a clevis 5, to which the draft-animals may be hitched when desired, there being sustained at the rear of the frame journals 6, n which is pivoted an arched or crank axle 7, carrying main transporting-wheels 8.

Journaled at the forward end of the main frame by means of trunnions 9, seated in bearings in the side bars 2, is a horizontal rocking member or casting 10, carrying the upper member or disk 11 of a turn-table, the lower member or disk 12 of which has fixed thereto a vertical pintle or axle 13 in the form of a king-bolt having bearing in the casting 10, there being carried by the member 12 of the turn-table a pair of downwardly-divergent arms 14, having horizontal portions or spindles 15, on which are journaled front transporting and guiding wheels 16, which may be readily turned for guiding the machine in its travel over the ground, there being fixed upon the upper end of the king-bolt 13 an arm 17, to which is attached a pole or tongue 18, to which the draft-animals may be attached when desired.

Fixed to the rear end of the frame 1 is a pair of downwardly and inwardly convergent members or standards 19, to the lower ends of which are attached a pair of coöperating beet-engaging members or shoes 20, the inner opposed faces of which converge relatively from their front toward their rear ends and at the same time have their upper faces inclined downwardly and inwardly in a transverse direction from their outer toward their inner edges, these shoes being designed in practice to engage respectively on opposite sides of the beets and to act for initially freeing the latter from the ground, while projecting rearwardly from and carried respectively by the shoes is a pair of upwardly and rearwardly inclined lifting members or arms 21, arranged in appropriately-spaced and parallel relation, these arms serving after the beets have been initially loosened by means of the shoes 20 to engage upon opposite sides of and beneath the beets for raising the latter above the ground-surface. On reference to Figs. 9, 10, and 11 it will be seen that the shoes 20 have their upper faces 22 inclined upwardly from their front toward their rear ends and at the same time curved gradually from the highest point of their outer edges to the lowest point of their inner edges, thus presenting smooth surfaces which will act properly upon and without injury to the beets during the operation of loosening the latter from the soil, there being provided at the outer faces and adjacent the rear ends of the shoes seats or recesses 23 for the reception of the ends of the lifting-arms 21, which are securely bolted or otherwise attached to the shoes.

For breaking the soil to permit passage of the arms 21 therethrough there are attached to the front edges of the standards 19 directly above the shoes 20 cutting members or blades 24, which, as seen in Fig. 12, have two pairs of spaced perforated ears 25, adapted to fit upon the forward edges of the standards and receive fastening members or bolts by means of which the blades are secured in place, it being apparent that the blades are thus sustained at an inclination corresponding to that of the standards and will consequently act more effectually for breaking and loosening the soil for the purpose above mentioned.

Hung beneath the main frame 1 is an auxiliary frame or carrier 26, sustained at its rear end by means of a hanger comprising an upper horizontal member or rod 27, journaled at its ends in the side bars 2, vertical members or links 28, slotted adjacent their lower ends, as at 29, and a lower horizontal member or rod 30, arranged for vertical play in the slot 29 and having its ends journaled in the side bars of the frame 26, which latter is sustained at its forward end by a hanger member or rod 31, pivotally connected at its lower end with the frame 26 and adapted for vertical sliding movement at its upper end through a member or bar 32, which in turn has pivotal connection at its end with the side bars of the main frame, there being disposed upon the hanger-rod 31 a normally expanded spring 33, adapted when the parts are in operative position, as seen in Fig. 2, to press the forward end of the frame 26 yieldably downward to its work.

The frame 26 is further sustained at a point between its ends by means of a pair of hangers 34, similar in character to the hanger 31 and pivotally connected at their lower ends, respectively, with the side bars of the frame 26, these hangers 34 being slidable at their upper ends through suitable bearing-openings in a rocking member or bar 35, in turn journaled at its ends in the side bars 2 of the main frame, while upon each of the hangers 34 there is disposed a normally expanded spring 36, which, as in the instance of the spring 33, presses the frame yieldably to its work.

Disposed obliquely of the frame 1 and bolted or otherwise secured to the forward end of the carrier-frame 26 is a cutting member or knife 37, designed as the machine advances along the row of beets to cut the foliage from the tops thereof, while adjacent the rear end of the frame 26 and carried by a downwardly and rearwardly and forwardly curved arm 38 is a topping member or blade 39, adapted for removing the tops from the beets after the foliage has been removed by the foliage cutter or knife 37, there being journaled within the frame 26 immediately in advance of the topping-blade 39 a roller 40, beneath which the blade 39 extends and operates in topping the beets. It may be mentioned in this connection that the roller 40 travels over the surface of the ground, conforming to irregularities therein, and thus, owing to the frame 26 being yieldably sustained and the blade 39 fixed for vertical movement with the frame, automatically adjusts said blade for properly severing the tops of the beets directly at the surface-level, whereby the topping operation will be uniform and liability of the beets themselves being cut or damaged by the blade obviated. It is further to be observed that the foliage-cutter and forward bar of the frame 26 conjointly present a foliage-receiving trough 37' of substantially semicircular form in cross-section, as seen in Figs. 4 and 6, in which the foliage removed from the tops of the beets will be received and by which, owing to its oblique inclination, said foliage will be delivered automatically at the side of the machine and out of the path of the knife 39 and roller 40.

For raising and lowering the carrier-frame 26 there is provided a hand-lever 41 within convenient reach from the seat 42 and having the usual pawl 43, designed for engagement with a toothed segmental rack 44, secured to one of the side bars 2, the lever being fixed in any appropriate manner upon one end of the upper member or rod 27 of the rear hanger, while immediately in rear of the foliage-cutter 37 is a bearing member or shoe 45, adapted to travel upon the ground-surface and adjustably sustained by means of links 46, pivoted at their lower ends to the shoe and having slot-and-bolt connections 47 at their upper ends with the front bar of the frame 26, whereby the shoe may be arranged for initially adjusting the inclination of the cutter 37.

Fixed upon the axle 7 and within reach of the seat 42 is an operating-lever 48, adapted for rocking the axle in its bearings to raise and lower the beet-lifting devices 20 21 and adjusting the depth of their entrance into the ground, this lever being equipped with a pawl 49, which engages a toothed segmental rack 50 for locking the axle to maintain the beet-lifters in their properly-adjusted positions.

In practice, supposing the parts to be adjusted to their active positions, as illustrated in Fig. 2, as the machine advances along the row of beets the cutter 37 comes first into action upon and removes the foliage from the beet-tops, this foliage being received by and delivered through the medium of the trough 37' at the side of the machine, as heretofore explained, while the topping-knife 39 next comes into action for removing the worthless portions of the beet-tops, after which the beets pass between the shoes 20 and are loosened thereby and finally elevated and deposited upon the ground-surface through the medium of the lifting-arms 21, it being apparent that during transportation of the harvester from place to place the frame 26, together with the cutters carried thereby, may through the medium of the lever 41 be elevated to the inactive position, (shown in Fig. 1,) as may also the beet-lifting devices through the medium of the lever 48.

From the foregoing it will be seen that I produce a simple inexpensive harvester which in practice will effectually remove the foliage from and top the beets and thereafter pull the latter from and deposit them upon the surface of the ground, these operations being all automatically performed and without injury to the beets, it being understood that in attaining these ends minor changes in the details of construction herein set forth may be resorted to without departing from the spirit of the invention.

Having thus fully described the invention, what is claimed as new is—

1. In a beet-harvester, a main frame, an auxiliary frame operatively connected therewith and provided with a conveyer-trough, a foliage-cutter carried by the auxiliary frame and communicating with said trough, and a topping device carried by the auxiliary frame in rear of the foliage-cutter.

2. In a beet-harvester, a main frame, a carrier yieldably suspended therefrom, a foliage-cutter carried by and movable with the carrier, a topping device fixed upon the carrier in rear of the foliage-cutter, and a roller operatively connected with the carrier and designed to travel over the ground-surface for automatically adjusting the topping device relative to the latter.

3. In a beet-harvester, a main frame, a carrier operatively connected therewith, a foliage-cutter sustained by the carrier, and a vertically-adjustable shoe pivotally connected in rear of the cutter and operatively connected with the carrier.

4. In a beet-harvester, a main frame, a carrier-frame yieldably suspended therefrom, a foliage-cutter sustained by the carrier-frame, a topping device also sustained by the carrier in rear of the foliage-cutter, means for raising and lowering the carrier-frame, and beet-lifting devices sustained in rear of the carrier-frame.

5. In a beet-harvester, a main frame, an auxiliary frame, hangers pivotally connected with one of the frames and having sliding connection with the other, springs on said hangers for pressing the auxiliary frame yieldably downward to its work, a foliage-cutter carried by the auxiliary frame and a topping device also carried by said frame in rear of the foliage-cutter.

6. In a beet-harvester, a main frame, an auxiliary frame, hangers pivoted to one of said frames and having sliding connection with the other, springs on said hangers for pressing the auxiliary frame yieldably downward to its work, foliage-cutting and beet-topping devices carried by the auxiliary frame, and a roller journaled in the latter for travel over the ground to automatically adjust said devices relative to the latter.

7. In a beet-harvester, a main frame, an auxiliary frame, hangers pivotally connected with one of said frames and having sliding connection with the other, springs operatively connected for pressing the auxiliary frame yieldably downward to its work, foliage-cutting and topping devices carried by and movable with the auxiliary frame and a member operatively connected with said frame and adapted to travel over the ground-surface for automatically adjusting the topping devices relatively to the latter.

8. In a beet-harvester, a main frame, a carrier operatively connected therewith, a foliage-cutter sustained by the carrier, a vertically-adjustable shoe pivotally connected in rear of the cutter, and a link pivoted to the shoe and adjustably connected with the carrier.

9. In a beet-harvester, a main frame, a carrier operatively connected therewith, a foliage-cutter sustained by the carrier, a vertically-adjustable shoe pivotally connected in rear of the cutter and adapted to bear on the ground-surface, and links pivotally connected with the shoe and having slot-and-bolt connection with the carrier.

In testimony whereof I affix my signature in presence of two witnesses.

JAMES W. ARTHUR.

Witnesses:
 LESSER LEVY,
 ALBERT LEWIN.